(12) United States Patent
Miyabukuro

(10) Patent No.: US 6,361,179 B1
(45) Date of Patent: Mar. 26, 2002

(54) STABILIZATION DEVICE

(75) Inventor: Pedro Takashi Miyabukuro, Estado de São Paulo (BR)

(73) Assignee: Metagal Industria E Commercio LTDA, Sao Paulo (BR)

( * ) Notice: Subject to any disclaimer, the term of this patent is extended or adjusted under 35 U.S.C. 154(b) by 0 days.

(21) Appl. No.: 09/782,866

(22) Filed: Feb. 14, 2001

(51) Int. Cl.⁷ .............................. G02B 7/182
(52) U.S. Cl. .............. 359/879; 359/871; 359/872; 359/213; 359/214
(58) Field of Search .............. 359/879, 871, 359/872, 873, 838, 841, 877, 213, 214, 220; 248/479, 487; 310/311, 323

(56) References Cited

U.S. PATENT DOCUMENTS 5,210,651 A * 5/1993 Shibuya et al. ............. 359/841
5,566,029 A * 10/1996 Zebold ....................... 359/872
5,815,302 A * 9/1998 Mc Vey et al. ............. 359/214

* cited by examiner

*Primary Examiner*—Mohammad Sikder
(74) *Attorney, Agent, or Firm*—Michael J. Striker

(57) ABSTRACT

An external rearview mirror has a mirror set, a base receiving the mirror set in an articulated way, a regulating device for positioning the mirror plate, a support structure for the regulating device, a housing accommodating components of the mirror set and fixed in the support structure, and a stabilization device for stabilizing a mirror position and incorporated in the support structure, wherein the stabilization device includes, a first indented surface provided on the mirror set and disposed in the sleeve, a second indented surface provided on the base adjacent to the first indented surface to the sleeve, and an axial compression spring arranged around the pivot post and pressing the sleeve for connecting the indented surfaces with one another, so that the mirror set is either not deflected and does not have its integrity or torque strength endangered, or is deflected and has its integrity preserved.

8 Claims, 3 Drawing Sheets

STABILIZATION DEVICE

BACKGROUND OF THE INVENTION

The present invention relates to a stabilization device for external rearview mirrors.

External rearview mirrors are well known and widely utilized. They usually include a mirror plate, a mechanical or electrical device for positioning of the mirror plate and formed as an actuator fixed with a posterior face of the mirror plate, transmission cables or an electrical cable extending from the actuator, and levers or activation buttons in the interior of the vehicle and connected to the cables. The mirror usually also has a support structure in which the actuator is fixed, a housing with an opening facing a region behind the vehicle and accommodating the mirror plate, with pivoting means and with a stabilization device incorporated in the support structure and mounted around the post. Also, a base is fixed to a side of the vehicle and a protuberance in which the post is fixed. The housing of the external rearview mirror protects the mirror plate against eventual impacts and/or changes of position caused by external agents and/or passerby. The device for stabilization in the post maintains the entire set, including the mirror plate, the activator, the support structure and the housing, in the use position. It is deviated forwardly or rearwardly to the base under the action of impact to preserve integrity of the external rearview mirror.

In conventional construction the stabilization device is formed as a bracket which is pressed around a vertical pivot post radially. The construction however loosens due to trepidations of the vehicle and/or the dilitation and contraction of the materials under the action of temperature and/or fatigue of the material and/or other factors. These causes changes in the position and/or trepidation of the mirror set. As a result of loosening, the connection must be retightened. The mirror must have means for accessing the stabilization device for retightening purposes. The access means has been a problem in the conventional external rearview mirrors.

SUMMARY OF THE INVENTION

Accordingly, it is an object of the present invention to provide a device for stabilization of a mirror position of an external rearview mirror, which eliminates the disadvantages of the prior art.

It is also an object of the present invention to provide a similar construction for the stabilization device which also ensures a simpler method of manufacture.

In keeping with these objects which will become apparent hereinafter, one feature of present invention resides, briefly stated, in an external rearview mirror which has a mirror set including a mirror plate; a base receiving said mirror set in an articulated way; a regulating device for positioning said mirror plate; a support structure for said regulating device; a housing accommodating components of said mirror set and fixed in said support structure; and a stabilization device for stabilizing a mirror position and incorporated in said support structure, said stabilization device being arranged articulatedly around a vertical pivot post of said base and including a plate structure fixable to a side of a vehicle, and a protuberance mounted on an inferior end of said post, said stabilization device providing an axial force relative to said pivot point and including a sleeve incorporated in said support structure and articulated in said pivot post, a first indented surface provided on said mirror set and disposed in said sleeve, a second indented surface provided on said base adjacent to said first indented surface to said sleeve, said indented surfaces being engageable with one another, said stabilization device further having an axial compression spring arranged around said pivot post and pressing said sleeve for connecting said indented surfaces with one another, said spring pressing said first indented surface against said second indented surface with an axial strength selected to locking said indented surfaces and to stabilize said mirror set and said base in normal condition of use and so that when said mirror set receives an impact with a torque strength $0<T<T_{of\ balance}$ it is not deflected and does not have its integrity or torque strength endangered, and when $T_{of\ balance}<T<T_{maximum}$ it is deflected and has its integrity preserved.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
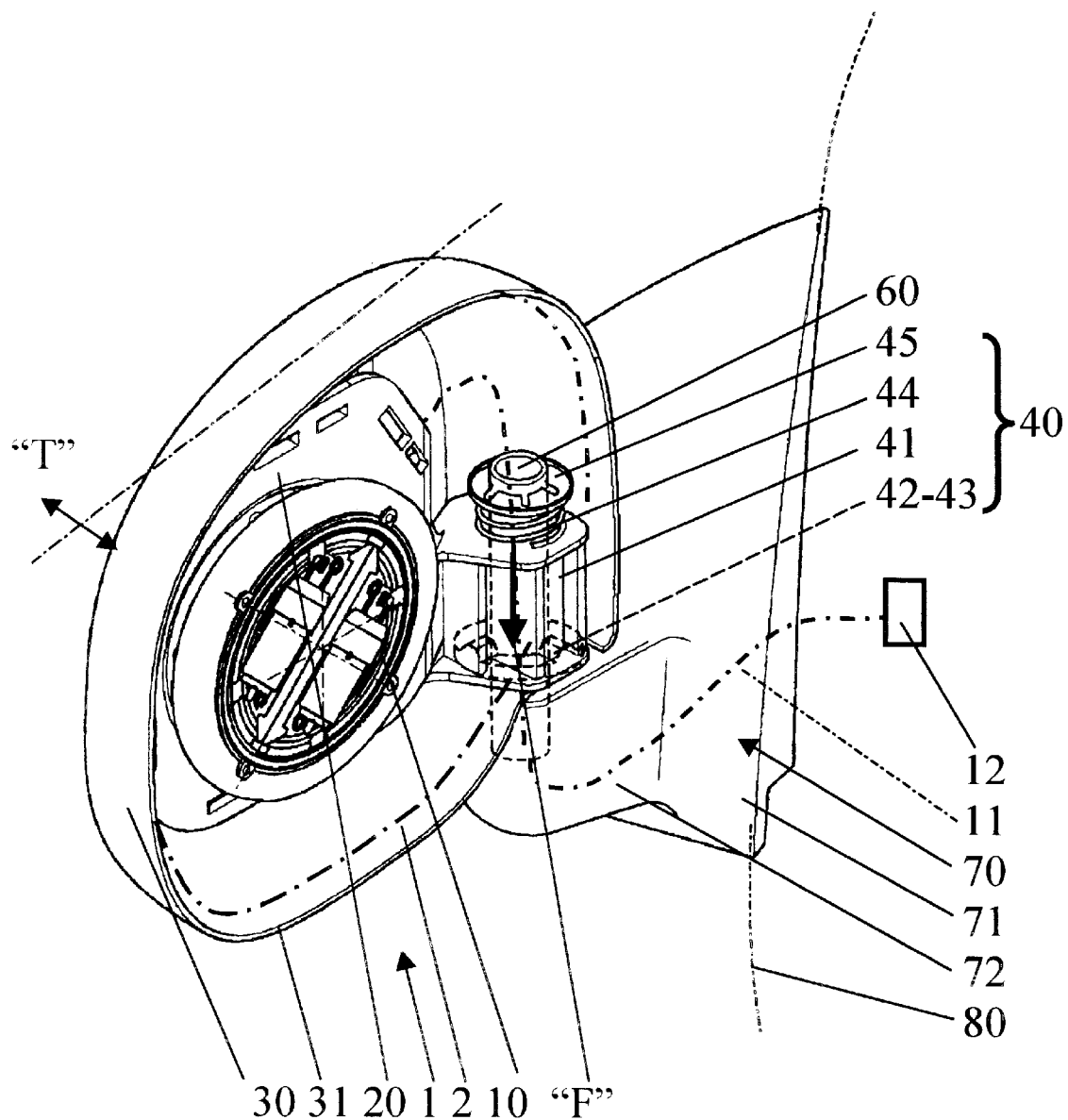
FIG. 1 is a view showing a mirror with a stabilization device in accordance with the present invention.
Figure 2:
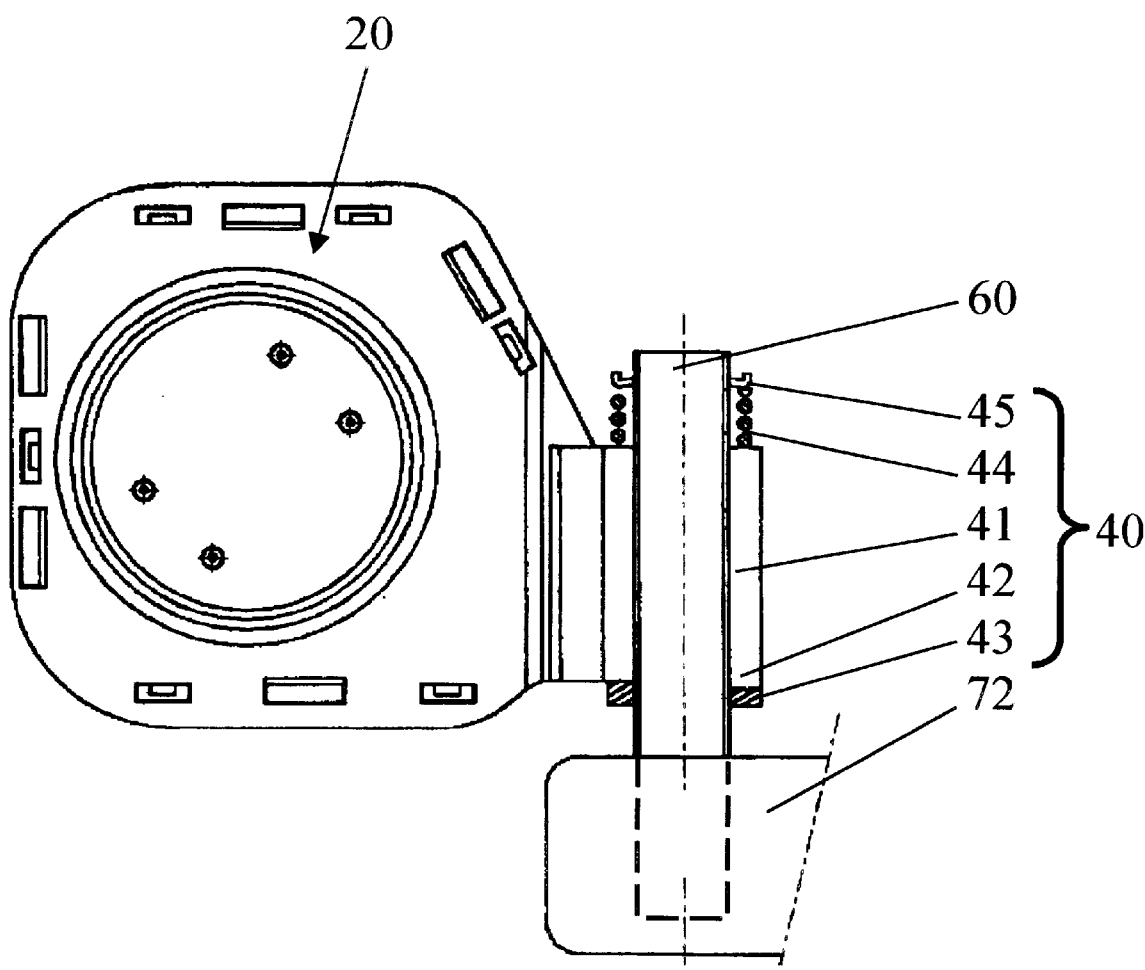
FIG. 2 shows a support structure which is a part of the mirror and incorporates a device in accordance with the present invention in an exploded representation.
Figure 3:
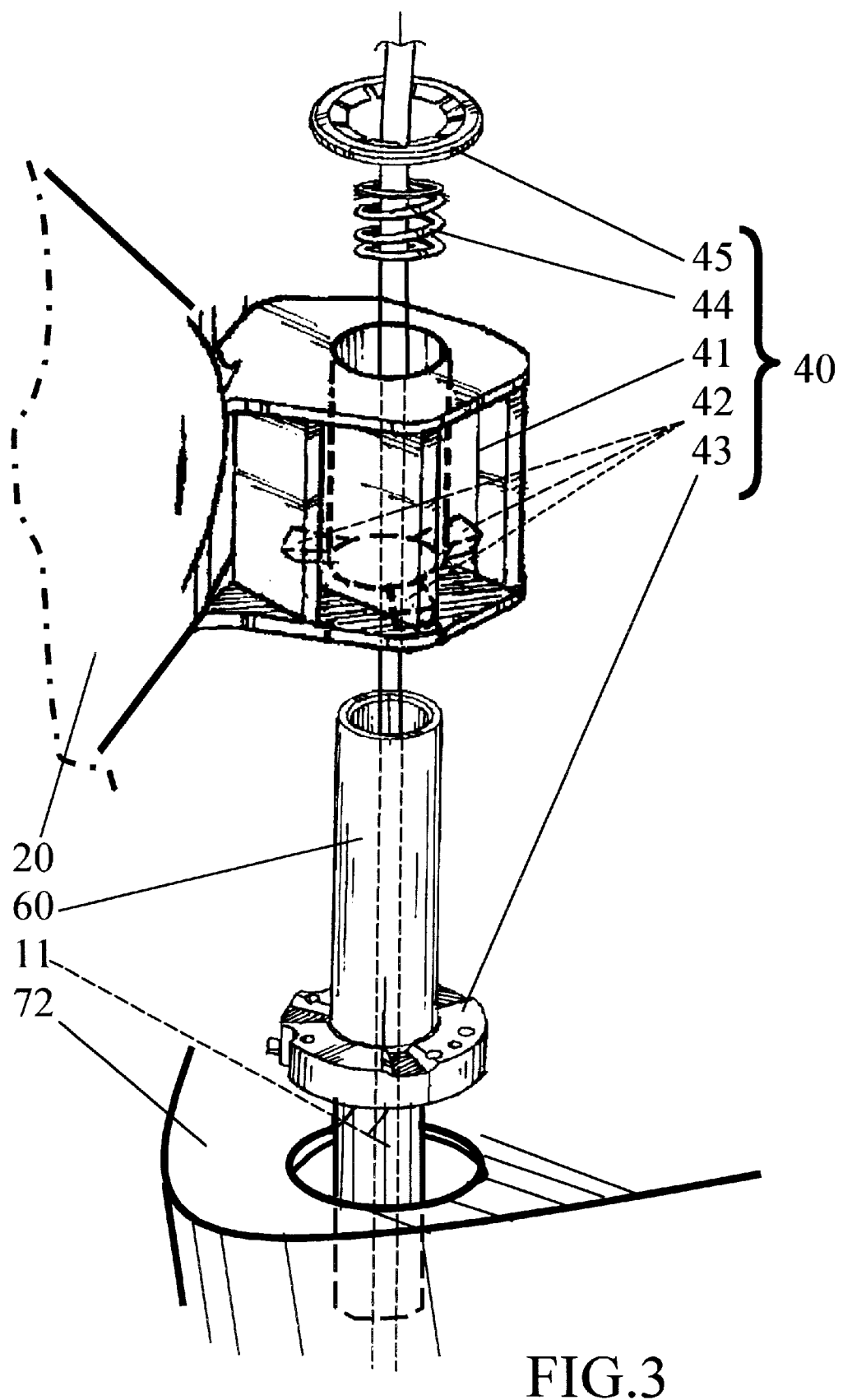
FIG. 3 is a view showing a device in accordance with one embodiment of the invention, in perspective.

A stabilization device in accordance with the present invention is used for an external rearview mirror of an automotive vehicle. The external rearview mirror includes a mirror set 1, and a base 70 which articulately receives the mirror set 1 and is fixed to a body 80 of the vehicle.

The mirror set includes a mirror plate 2, a mechanical or electrical device for positionin of the mirror plate and including an actuator fixed to a posterior face of the mirror plate, transmission cables or an electrical cable 11 extending from the actuator; and levers or an actuation button 12 located inside the vehicle and connected to the cable. The mirror set also has a support structure 2 in which the actuator 10 of the mirror plate 2 is fixed, a housing 30 with an opening 31 directed to a posterior region of the vehicle and accommodating the mirror plate 2, the mirror plate activator 10 and the support structure 20. The housing 30 is fixed in the support structure 20. A device for position stabilization of the mirror is incorporated in the support structure and mounted in an articulated way about a vertical pivot post 60 of the base 70. The base 70 includes the pivot point 60, a plate structure 71 fixed to the side of the vehicle, and a protruberance 72 in which an inferior end of the post 60 is mounted.

The device 40 for stabilization of the mirror position provides stabilization of the mirror set through an "F" axial strengthening force to the pivot post 60. It includes a sleeve 41 incorporated in an end of the support structure 20 directed to the vehicle and rotatable around a pivot post 60. A first indented surface 42 of the mirror set 1 is disposed in one of the ends of the sleeve 41 around the pivot post 60. A second indented surface 43 of the base 70 is disposed around the pivot post 60 and adjacent to the first indented surface 42 of the sleeve 41. The indented surfaces 42 and 43 have adequate contours for engaging each other.

An axial compression spring 44 is located around the pivot post 60. It has one end pressed against the end of the sleeve 41 which is opposite to the indented surface 42. An element 45 is fixed around the pivot post 50 at the other end of the spring 44. The spring 44 presses the first indented surface 42 of the mirror set 1 against the indented surface 43 of the base 70 with the adequate axial force "F". It provides locking between the above mentioned indented surfaces and stabilization of the mirror set 1 in the base 70 in normal use conditions. Also, when the mirror set 1 receives an impact with the torque strength $0<T<T_{of\ balance}$, it is not deflected and does not have his integrity or torque strength endangered $T_{of\ balance}<T<T_{maximum}$ be deflected and has its integrity preserved.

The indented surface 42 and 43 can be formed by projections and small channels of a trapezoidal cross-section, located radially in the end of the sleeve 41 and around the pivot post 60 or vice versa. The lateral oblique surfaces of these formations are arranged one against the other and have selected implentations for sliding relative to one another when the set receives the torque strength zero$<T<T_{of\ balance}$ and $T_{of\ balance}<$less $T_{maximum}$ correspondingly.

The stabilization device in accordance with the present invention operates in the following manner. When the mirror is in normal use conditions, the spring 44 pushes the indented surface 42 of the mirror set 1 against the indented surface 43 of the base 70, locking the indented surfaces 42 and 43 in one another. Therefore the mirror set 1 remains stabilized in the used position, even in the event of windshield trepidation brought about by the vehicle and/or impacts with torque strength $0<T<T_{of\ balance}$. When the mirror set 1 receives an impact with a torque strength $0<T<T_{of\ balance}$, its indented surface 42 collides against the indented surface 43 of the base 70 with a sufficient force to slide and to compress the spring 44. The indented surfaces remain engaged with one another without deflection of the mirror set 1. The impact with the adequate torque strength $T<T_{of\ balance}$ is not enough and does not compromise the integrity of the mirror set 1.

When the mirror suffers an impact with torque strength $T_{of\ balance}<T<T_{maximum}$, the indented surface 42 of the mirror set 1 collides against the indented surface 43 of the base 70 with enough strength to slide relative to it. As a result, there is a helicoidal movement of the above mentioned indented surface 42 relative to the spring 44 until it is separated from the indented surface 43 of the base. At this moment the sleeve 41 of the mirror set can turn around the pivot post 60 and the mirror set 1 is deflected from the base 70, without endangering the integrity of the mirror set.

In order to put the mirror set in place again, it is enough to manually dislocate the mirror set 1 to the use position, so that the indented surface 42 is dislocated relative to the indented surface 43 of the base 70 angularly. At the end of the course the teeth of the same are coupled due to the spring force 44, and this automatically carries the mirror set with the axial force F. No access to any internal component of the mirror is necessary as in conventional external rearview mirrors.

It is believed to be clear that the inventive stabilization device provides stabilization of the external rearview mirror position and does not require any access to any internal element of the mirror.

Additional modifications and changes can be possible in the inventive stabilization device of the present invention. The indented surface 42 of the mirror set can be disposed in the interior end of the sleeve 41, while the indented surface 43 of the base 70 can be disposed under the same, in a flange around the pivot post 60 or in a ring disposed around it and fixed in the base 70. The spring 44 and the member 45 can be disposed next to the superior end of the sleeve 41 and in the superior free end of the pivot post 60. Opposite solutions to the above described are also possible for the coupling surface set, spring and reaction stop in the inferior or superior end of the sleeve and the post with only one blockade and reaction washer remains mounted on the opposite end of the post.

The external rearview mirror can have different ornamental configurations and can be provided for different vehicles, such as pickups, driving cars, and others with the regulating mechanism of the plate position.

It will be understood that each of the elements described above, or two or more together, may also find a useful application in other types of constructions differing from the types described above.

While the invention has been illustrated and described as embodied in STABILIZATION DEVICE, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention. What is claimed as new and desired to be protected by letters Patent is set forth in the appended claims.

What is claimed is:

1. An external rearview mirror, comprising a mirror set including a mirror plate; a base receiving said mirror set in an articulated way; a regulating device for positioning said mirror plate; a support structure for said regulating device; a housing accommodating components of said mirror set and fixed in said support structure; and a stabilization device for stabilizing a mirror position and incorporated in said support structure, said stabilization device being arranged articulatedly around a vertical pivot post of said base and including a plate structure fixable to a side of a vehicle, and a protuberance mounted on an inferior end of said post, said stabilization device providing an axial force relative to said pivot point and including a sleeve incorporated in said support structure and articulated in said pivot post, a first indented surface provided on said mirror set and disposed in said sleeve, a second indented surface provided on said base adjacent to said first indented surface to said sleeve, said indented surfaces being engageable with one another, said stabilization device further having an axial compression spring arranged around said pivot post and pressing said sleeve for connecting said indented surfaces with one another, said spring pressing said first indented surface against said second indented surface with an axial strength selected to locking said indented surfaces and to stabilize said mirror set and said base in normal condition of use and so that when said mirror set receives an impact with a torque strength $0<T<T_{of\ balance}$ it is not deflected and does not have its integrity or torque strength endangered, and when $T_{of\ balance}<T<T_{maximum}$ it is deflected and has its integrity preserved.

2. An external rearview mirror as defined in claim 1; and further comprising a member fixed around said pivot point so that said spring is pressed against said member.

3. An external rearview mirror as defined in claim 1, wherein said sleeve is incorporated in said support structure in direction of a vehicle, said first indented surface being located in an inferior end of said sleeve and around said pivot post, said second indented surface being fixed in said base or in said pivot point, said spring being formed as a radial compression spring and located around a superior end of said pivot post and also having an inferior end pressed against a superior end of said sleeve opposite to said first indented surface.

4. An external rearview mirror as defined in claim 3, wherein said member is fixed around said superior end of said pivot post so that a superior end of said spring presses against said member.

5. An external rearview mirror as defined in claim 1, wherein said indented surfaces include a projection and a channel having a trapezoidal cross-section and located radially in an end of said sleeve and around said pivot post or vice versa, so that lateral oblique faces of said indented surfaces are located against one another and their inclinations are selected not to slide or to slide relative to one another when said mirror set receive torque strength $0<T<T_{of\ balance}$ and $T_{of\ balance}<T<T_{maximum}$ respectively.

6. An external rearview mirror as defined in claim 2, wherein said indented surface of said mirror set is located in a superior end of said sleeve, said second indented surface of said base being located in a superior end of said post, said spring being located around an inferior end of said pivot post and against an inferior end of said sleeve, said member being disposed in an inferior end of said pivot post so that said spring abuts against said member.

7. An external rearview mirror as defined in claim 2, wherein said first indented surface of said mirror set is located in an inferior end of said sleeve, said second indented surface of said base being disposed in a flange of an interior end of said post and coupled to the latter, said compression spring being located around an inferior end of said pivot post and against a force of flange opposite to said second indented surface, said limiting member being located in an interior end of said pivot post, said spring being pressed against said limiting member, said limiting member being fixed to said pivot ends of said pivot post and provides compression of a superior end of said sleeve.

8. An external rearview mirror as defined in claim 2, wherein said first indented surface of said mirror set is located in a superior end of said sleeve, said second indented surface of said base being located in a flange of a superior end of said pivot post and coupled to the latter, said compression spring being located around a superior end of said pivot post opposite to said second indented surface, said member being located in a superior end of said pivot post so that the spring presses against said member, said member being fixed in an inferior end of said pivot post so that an inferior end of said sleeve presses against said member.

* * * * *